United States Patent [19]
Fomenkov et al.

[11] Patent Number: 5,898,725
[45] Date of Patent: Apr. 27, 1999

[54] EXCIMER LASER WITH GREATER SPECTRAL BANDWIDTH AND BEAM STABILITY

[75] Inventors: Igor Vladimirovich Fomenkov, San Diego; Richard L. Sandstrom, Encinitas, both of Calif.

[73] Assignee: Cymer, Inc., San Diego, Calif.

[21] Appl. No.: 08/786,186

[22] Filed: Jan. 21, 1997

[51] Int. Cl.$^6$ ...................................... H01S 3/08
[52] U.S. Cl. .............................. 372/102; 372/25; 372/57; 372/103; 372/34
[58] Field of Search .............................. 372/102, 34, 103, 372/25, 57

[56] References Cited

U.S. PATENT DOCUMENTS

| | | |
|---|---|---|
| 4,609,286 | 9/1986 | Sage, Jr. . |
| 4,873,692 | 10/1989 | Johnson et al. ......................... 372/102 |
| 5,130,994 | 7/1992 | Madey et al. . |
| 5,153,887 | 10/1992 | Krapchev . |
| 5,404,366 | 4/1995 | Wakabayashi et al. ................. 372/102 |
| 5,414,723 | 5/1995 | Krapchev . |
| 5,596,596 | 1/1997 | Wakabayashi et al. ................. 372/102 |
| 5,761,236 | 6/1998 | Kleinschmidt et al. ................ 372/100 |

FOREIGN PATENT DOCUMENTS

| | | |
|---|---|---|
| 0 472 727 B1 | 5/1990 | European Pat. Off. . |
| 6-164029 | 6/1994 | Japan . |

*Primary Examiner*—Leon Scott, Jr.
*Attorney, Agent, or Firm*—John R. Ross

[57] ABSTRACT

An excimer laser having reduced spectral bandwidth variation is provided. The laser has an assembly of components comprising a beam expander having at least two prisms that reduces the spectral bandwidth of the laser beam that is passed through the assembly. At least one of the prisms of the beam expander is made of a thermally stable material, wherein the material has an coefficient of absorption of no more than about 0.1 percent/cm for light having the desired wavelength, a rate of change of refractive index with temperature of no more than about $2.3 \times 10^{-6} \, °C.^{-1}$, a thermal conductivity of at least about 9.71 W/m-°C. at 20 deg C., and/or a coefficient of thermal expansion of at least about $9 \times 10^{-6}$ (deg C.)$^{-1}$. In a preferred embodiment, the stability of beam profile is improved, the variation in spectral bandwidth of the beam from the laser is reduced, the spectral bandwidth itself is also reduced, and the laser exhibits greater voltage stability.

16 Claims, 3 Drawing Sheets

EXCIMER LASER WITH GREATER SPECTRAL BANDWIDTH AND BEAM STABILITY

FIELD OF THE INVENTION

The invention relates to a laser, particularly an excimer laser for use in photolithography, that has spectral narrowing assembly control and which laser, consequently, produces a beam of light with an improved beam profile and consistently-narrow spectral bandwidth.

BACKGROUND OF THE INVENTION

Excimer lasers are used in a number of applications, and one application in which excimer lasers have found particular use is photolithography for chip manufacture. Light from the laser illuminates a photoresist layer spun onto a silicon substrate, and a mask between the laser and the substrate allows some of the laser light to illuminate portions of the photoresist. The photoresist is subsequently developed, and the substrate is etched in areas unprotected by the photoresist.

For some photolithography applications, a laser beam produced within a laser chamber contains light within a range of wavelengths at or near the desired wavelength of 248.3 nm for a KrF excimer laser or 193.3 nm for an ArF excimer laser. The spectral-narrowing assembly removes much of the light at undesired wavelengths and returns the light within a desired narrow range back to the laser chamber. It is very desirable to produce a laser beam having a narrow spectral bandwidth with little variation in spectral bandwidth.

The laser is part of a larger piece of equipment such as a stepper or a scanner that processes the wafers. A typical stepper has a carousel that contains a number of wafers to be etched and otherwise processed to form a finished product such as a computer chip. The stepper removes one of the wafers coated with photoresist from the carousel and positions the wafer in the path of the laser light. The stepper also places the appropriate mask between the coated wafer and the laser light. The stepper assures that all components are properly aligned, and the stepper then instructs the laser to fire and expose a portion of the photoresist on the wafer to a series of pulses (i.e. a "burst") of laser light that provides sufficient energy to alter the exposed portion of photoresist so that its chemical composition differs from the chemical composition of the unexposed photoresist. The stepper shuts off the laser, repositions the wafer, and again the stepper fires the laser and exposes a portion of the photoresist to the laser light. The stepper continues this process of shutting off the laser, repositioning the wafer, and refiring the laser until the laser has exposed the entire layer of photoresist on the wafer. The stepper then replaces the wafer into the carousel, advances the carousel, and removes another wafer from the carousel. The stepper subsequently repeats the process of positioning the second wafer, firing a burst, and repositioning the second wafer until the photoresist on the surface of the second wafer is completely exposed. The stepper then repeats the process until all wafers in a carousel are exposed. The carousel is removed from the stepper, and another carousel is inserted to begin the process anew. A scanner operates similarly to a stepper, but the scanner includes scanning operations during which the beam is scanned across portions of the wafer. This is typically accomplished by moving the wafer and mask continuously under the beam.

Because of the stepping mode of operation in a stepper or scanner, the laser does not operate in a continuous or steady-state manner. The laser could be fired continuously or in a predictable periodic fashion, and the power of the beam could be used on demand by opening a shutter on the laser in order to have consistent operation of the laser. However, it is much more economical to stop firing the laser when the beam is not needed instead of firing the laser continuously and discarding the beam most of the time. The duty cycle for a laser used in conjunction with a stepper or scanner is typically between only about 10% and about 50%.

Intermittent operation of the laser creates transient phenomena that affect the consistency of the laser beam, and the transient conditions themselves vary substantially because of the varying "of" times associated with repositioning and realigning wafers, changing wafers, and changing carousels.

SUMMARY OF THE INVENTION

It is thus one object of the present invention to provide a laser having a more consistent spectral bandwidth under varying laser firing conditions. It is another object of preferred embodiments of the invention to provide a laser having a smaller spectral bandwidth than was previously provided. It is another object of certain embodiments of the invention to provide a laser with improved voltage stability. It is a further object to provide a beam expander for a laser with improved control over beam expansion and beam angle despite changes in the duty cycle of the laser.

Among other factors, the invention is based on the inventors technical finding that an excimer laser equipped with a spectral narrowing assembly as described herein (1) produces a beam with a more consistent bandwidth despite temperature variations caused by intermittent operation of the laser, (2) provides an expanded laser beam having very consistent dimensions, (3) produces a beam with a smaller spectral bandwidth, (4) has reduced energy requirements, (5) has improved voltage stability, and (6) has a longer life. These and other objects, factors, and advantages are apparent from the discussion herein, including the claims and the appended drawings.

The present invention provides for a laser with prisms which: (1) absorb little of the laser beam; (2) experience little change in refractive index with change in temperature of those prisms; (3) have a high thermal conductivity; (4) have a coefficient of thermal expansion that closely matches the coefficient of thermal expansion of the mounting system for the prisms; and/or (5) have a coefficient of thermal expansion that is offset by a change in refractive index with change in temperature. The invention also provides a method for reducing the spectral bandwidth variations in a beam of light from a laser, which method comprises transmitting the beam of light generated by the laser into a spectral-narrowing assembly whose prisms experience little change in their ability to expand a beam at substantially constant angle and dimensions despite changes in temperature of those prisms, as described above.

The inventor also found that, in a preferred embodiment of the invention, the laser produced a beam of light that had a smaller spectral bandwidth than was possible with previous lasers that utilized fused-silica prisms in the spectral-narrowing assembly.

BRIEF DESCRIPTION OF THE FIGURES

The Figures illustrate certain preferred embodiments of the invention, and, consequently, the claims are to be given their broadest interpretation that is consistent with the specification, the drawings, and the meaning of terms used herein to one of ordinary skill in the art.

DETAILED DESCRIPTION OF THE PREFERRED EMBODIMENT OF THE INVENTION

It had been determined that intermittent operation of the laser has resulted in inconsistent photoresist patterns in a number of instances. Intermittent operation has resulted in over- or under-exposure of photoresist, which led to semiconductor device reliability problems and failure. Continuous firing of the laser has produced a more consistent photoresist pattern than intermittent firing produced.

During experimentation with an approximately two-year old laser in the laboratory, the inventor noted that there were significant variations in the beam profile and the spectral bandwidth of the laser beam when the laser was fired intermittently instead of being fired continuously. These variations existed even though the laser had a well-known spectral-narrowing assembly having three high-quality fused-silica prisms, an aperture in front of the prisms and an aperture intermediate between the second and third prisms, an echelle grating, and a mirror to reflect light from the prisms to the grating that, in combination, reduced spectral bandwidth of the laser beam. Spectral variations and variations in the beam profile cause inconsistent photoresist patterns, and the pattern is not as sharp and well-defined when the spectral bandwidth is wide as when the spectral bandwidth is narrower. The inventor thus decided to investigate the source of these spectral variations and provide an improved laser that did not have the spectral variation.

An excimer laser used in photolithography is a complex device having many components that cooperate to produce a laser beam of the desired beam profile, wavelength, pulse energy, and spectral bandwidth. After a substantial amount of experimentation, the inventor's discovered that the source of spectral bandwidth and beam profile variation was within the spectral-narrowing assembly itself. The inventor determined that the prisms of the spectral-narrowing assembly absorbed some of the beam energy, and the prisms heated because of the absorbed energy. The increased temperature of the prisms caused the laser beam to be refracted differently than when the temperature was lower. A critical portion of the prisms acted like a thermal lens, diverting the light from its intended path so that the light exited the prisms in a slightly but significantly different fashion.

This thermal lens effect caused significant variations in laser beam expansion and in control of spectral bandwidth. For example, if the laser described above was fired in short bursts with a long time period between bursts, a significant change in beam expansion occurred, and the spectral bandwidth varied much of the time that the laser operated in this manner (see FIG. 2A, wherein for the time period between 60 and 1000 seconds, the laser was operated at a 10% duty cycle and the spectral bandwidth was changing during much of this time period). Also, significant variations in spectral bandwidth are observed when the laser is fired in long, rapid bursts, the laser is stopped for a sufficiently short period of time that a wafer can be repositioned, and the laser is refired. A stepper fires the laser rapidly as a portion of a wafer is exposed, stops firing for a short time as the wafer is repositioned, refires the laser in another burst or series of bursts, again stops the laser for a shorter or longer period of time as the wafer is again repositioned, and again stops firing for a long period of time as a wafer or carousel is replaced. Because of the manner in which a stepper operates, the prisms of the spectral narrowing assembly are exposed to rapidly-changing amounts and rates of addition of beam energy. Consequently, the refractive properties of the prisms change rapidly and often as the stepper processes wafers. In particular, the refractive properties of the prisms changed substantially when the duty cycle of the laser changed.

The inventors learned that a laser equipped with a spectral narrowing assembly that had optical components which met certain specifications expanded the laser beam much more consistently, and consequently the laser had greater spectral bandwidth stability than had been achieved previously. The inventor's determined that a laser equipped with a spectral narrowing assembly having at least two prisms would experience reduced variance in beam expansion and spectral bandwidth despite changes in how long or how often the laser was fired when at least one of the prisms was made of a material that expanded the laser beam at substantially the same angle and to substantially the same dimensions despite changing conditions.

The inventors found that, the problems of variance in spectral bandwidth and beam profile distortion caused by burst-mode operation of the laser and rapid heat-up and cool-down of optics, could be reduced by designing a laser having a spectral-narrowing assembly whose elements were more stable to thermal changes. In a spectral-narrowing assembly initially having three fused silica prisms, substantial improvement in beam quality was observed when at least one of the prisms is made of a thermally-stable material which provides consistent beam expansion despite changes in the rate at which the laser is operating. Best performance was observed when all of the prisms were comprised of thermally stable material.

In one preferred embodiment of the invention, the last of the prisms in the expansion chain is made of a material which has a low absorption of light at the desired wavelength. (The last prism in this embodiment had the longest path for the beam to travel through the prism.) A prism will experience less temperature change and greater stability of its optical and physical properties discussed below if the material from which the prism is made absorbs less of the laser beam. Consequently, the coefficient of absorption of a prism is preferably less than 0.5 percent/cm and more preferably is less than about 0.1 percent/cm. Values for the coefficient of absorption at 248 nm (wavelength) of various materials are listed in Table 1 below.

In another preferred embodiment of the invention, at least one of the prisms is made from a material that experiences little change in refractive index as the temperature of the prism changes. The laser beam is expanded at a substantially constant angle if the refractive index changes little, and the width of the expanded beam exiting the prism is also substantially constant regardless of what temperature the prism has. A prism preferably has a rate of change in refractive index with temperature (dN/dT) of less than about $15 \times 10^{-6}$ (deg C.)$^{-1}$ or smaller (absolute value). Values for dN/dT of various materials are listed in Table 1 below.

In another preferred embodiment of the invention, at least one of the prisms is made of a material which has a high thermal conductivity. A high thermal conductivity provides two benefits. As the prism absorbs energy from the beam, the temperature of the prism will rise unless heat is conducted away from the prism rapidly. Consequently, a high thermal conductivity assures that the prism will remain close to ambient temperature. Also, a high thermal conductivity reduces thermal gradients within the prism. Thermal gradients can occur because beam energy which is absorbed into the prism is not conducted quickly throughout the prism. A low thermal conductivity causes the temperature of the portion of the prism carrying the beam to increase substantially, and a high thermal conductivity permits heat to disperse rapidly through the prism. A high thermal conductivity helps to avoid physical distortion of the prism as well as unusual refraction caused by e.g. significant variations in the refractive index across the prism. Preferably, the thermal conductivity of the material from which the prism is made about 9.7 W/m-°C. or greater at about 20 deg C. Values of the thermal conductivity for various materials are listed in Table 1 below.

In another preferred embodiment of the invention, at least one of the prisms is made of a material which has a coefficient of thermal expansion that is approximately equal to the coefficient of thermal expansion of the mounting material for the prism. The prism is mounted to a rigid structure such as metal with glue or metallic clamps. The prism has an overall temperature that is approximately equal to its surroundings. As the prism heats due to the beam passing through it, the surrounding structure also heats because the structure absorbs the energy of the light that is discarded by the prism and/or the grating. If the coefficient of thermal expansion of the prism is not at least approximately equal to the coefficient of expansion of the material to which the prism is mounted, the prism and its mount expand at different rates and in different amounts, and unusual stresses in the prism and/or mount are created. The prism can be distorted and/or moved slightly, and beam dimensions and angles are affected. If the coefficient of thermal expansion of the prism is at least approximately equal to the coefficient of expansion of the material to which the prism is mounted, the prism and its mount expand at approximately equal rates and amounts, and unusual stresses in the prism and/or mount are avoided. Thus, the beam's dimensions and angles are more consistent despite temperature changes when the coefficient of expansion of the prism approximates or equals the coefficient of expansion of the prism's mount. Metal housings typically have a coefficient of thermal expansion between about $9\times10^{-6}$ (deg C.)$^{-1}$ for steel and about $24\times10^{-6}$ (deg C.)$^{-1}$ for aluminum. Thus, for a prism mounted within a metal housing, the prism's coefficient of thermal expansion is preferably between about $9\times10^{-6}$ (deg C.)$^{-1}$ and $24\times10^{-6}$ (deg C.)$^{-1}$. Values of the coefficient of thermal expansion for various materials are listed in Table 1 below.

TABLE 1

|  | Fused Silica | CaF$_2$ | MgF$_2$[1] |
|---|---|---|---|
| Coefficient of absorption (for λ = 248 nm) (percent/cm) | 0.5–1 0.1 ÷ 0.5 | <0.1 | N/A[2] |
| dN/dT | $12.8 \times 10^{-6}$ | $-10.6 \times 10^{-6}$ | $2.3 \times 10^{-6}$ |

TABLE 1-continued

|  | Fused Silica | CaF$_2$ | MgF$_2$[1] |
|---|---|---|---|
| (deg C)$^{-1}$ | 15 (ab 248) | −6.3 ab (248) | and $1.7 \times 10^{-6}$ |
| Thermal conductivity Wm$^{-1\circ}$ C.$^{-1}$ | 1.38 | 9.71 | 0.3 |
| Coefficient of thermal expansion (deg C.)$^{-1}$ | $0.52 \times 10^{-6}$ | $18.85 \times 10^{-6}$ | $13.7 \times 10^{-6}$ and $8.48 \times 10^{-6}$ |

[1]MgF$_2$ is birefringent
[2]N/A = not available

In another preferred embodiment of the invention, the coefficient of thermal expansion and the rate of change of refractive index with temperature have offsetting effects. For example, where the portion of the prism contacted by the beam heats locally and causes the prism to distort the direction and/or dimensions of beam expansion, an opposite change in refractive index can offset this distortion and provide more consistent beam dimensions and/or direction. A CaF$_2$ prism expands as the temperature is increased, since its coefficient of thermal expansion is a positive value ($18.85\times10^{-6}$ (°C.)$^{-1}$). However, the rate at which the refractive index changes as temperature increases is a negative value ($-10.6\times10^{-1}$ (°C.)$^{-1}$). These effects tend to offset each other and provide a laser beam having dimensions at the exit of the prism that are more consistent than when both the coefficient of thermal expansion and refractive index of the prism do not offset each other.

In yet another preferred embodiment of the invention, at least one of the prisms of the assembly is made of a material wherein the coefficient of absorption, the rate of change of refractive index with temperature, the thermal conductivity, and the coefficient of thermal expansion are selected to provide a laser beam bandwidth variance that is no more than 50% and more preferably no more than 25% of the laser beam bandwidth variance supplied by an assembly wherein the assembly is identical to the assembly of this invention in all respects except that the prisms of the beam expander are made of fused silica. The laser beam bandwidth variance is the difference between a laser beam bandwidth measured when the laser is fired at a duty cycle of 10% and a laser beam bandwidth measured when the laser is fired at a duty cycle of 100%, wherein the laser is fired at the duty cycle of 100% immediately after the laser is fired at the duty cycle of 10%, and wherein the coherent beam of light has an energy of 12 mJ and a wavelength of 248.3 nm, as explained in Example 1. The coefficient of absorption, the rate of change of refractive index with temperature, the high thermal conductivity, and the coefficient of thermal expansion may each be selected as described above. Or, the above factors can be balanced so that one or two of the factors, for example, offset the effects of the other factors and provide consistent beam expansion under varying operating conditions.

Figure 1:
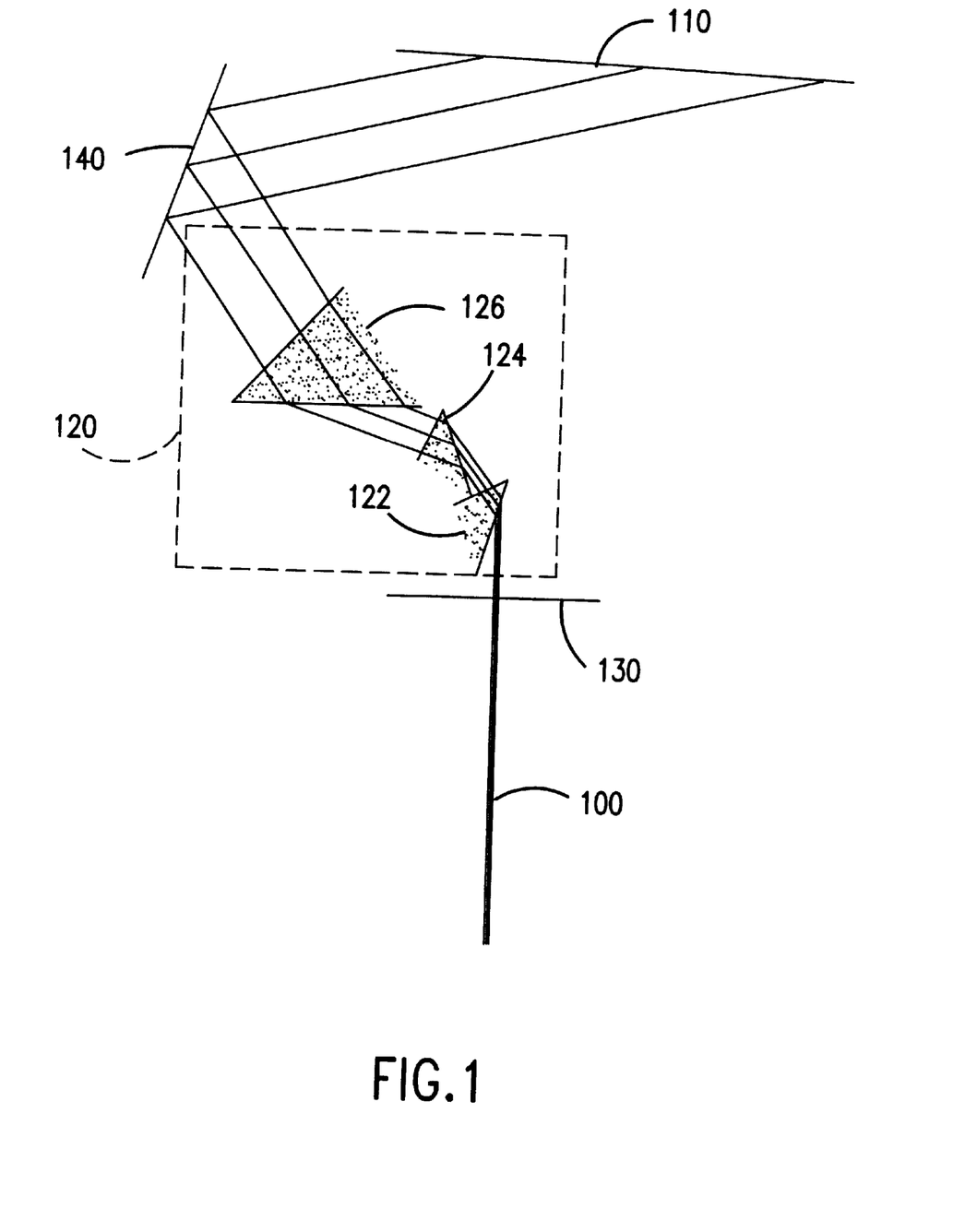
FIG. 1 illustrates one preferred beam expander of this invention, which provides an excimer laser with more consistent spectral bandwidth.

FIG. 1 shows a preferred spectral narrowing assembly of this invention that produces a coherent beam of light with little spectral bandwidth variation and good beam profile. In operation, an excimer laser generates a spectrally-broad, tall and narrow beam 100 within its discharge chamber, which beam has light of a desired wavelength and light of an undesired wavelength. The beam is reflected by an optical resonator that comprises a partially-reflective front mirror (not shown) at one end of the discharge chamber and an echelle grating 110 at the other end of the discharge chamber. The beam expander (contained in box 120 of the Figure) is positioned so that a portion of the laser beam generated in the discharge chamber passes through the prisms 122, 124, and 126 of the beam expander to grating 110.

The prisms of the beam expander are positioned such that the beam of light from the discharge chamber contacts the beam contact area of the first prism, and the beam expands in width as the beam is transmitted through prisms 122, 124 and 126. Mirror 140 directs the beam exiting prism 126 onto the surface of echelle grating 110. The light of the desired narrow range of wavelengths is reflected from grating 110 back through the prisms of the beam expander and back into the laser chamber; and substantially all of the light of the undesired wavelengths is reflected in directions such that it does not re-enter the laser chamber. The spectrally-narrowed beam re-enters the laser chamber, in further amplified and a portion of the amplified beam passes through it to the front mirror as output of the laser system.

The particular application in which the laser is to be placed determines the spectral bandwidth of the beam that the laser must produce and thus determines the particular configuration of the spectral-narrowing assembly. Prisms are very effective for expanding the beam initially and removing light of unwanted wavelengths, but prisms are less effective for removing light of unwanted wavelengths after much of the light of unwanted wavelengths has already been removed. A KrF laser with no spectral narrowing produces a beam having a spectral bandwidth of approximately 300 pm. If a prism is coated with an antireflection coating and is positioned to select light of a desired wavelength by expanding the beam and reflecting the light from a total-reflection mirror through the prism and back into the laser chamber, the spectral bandwidth can be reduced to e.g. approximately 100 pm. A second prism in series with the first prism can reduce the spectral bandwidth to e.g. approximately 50 pm, and a third prism in series with the others can reduce the spectral bandwidth to e.g. approximately 10–20 pm, depending on the size of the prisms and the angle at which the prisms face the laser beam. A grating positioned after a prism reduces the spectral bandwidth to much less than 10–20 pm. Thus, if a beam having a spectral bandwidth of approximately 50 pm can be used in a given application, the spectral-narrowing assembly needs only two prisms under this example. Or, if a beam of less than 10 pm spectral bandwidth is required, the spectral-narrowing assembly can use one, two, three, or more prisms and a grating.

In a particularly preferred embodiment, the invention provides a selective spectral-narrowing assembly as illustrated in FIG. 1 comprising an aperture 130, a beam expander 120 comprising three prisms, a mirror 140 and an echelle grating 110 arranged to reflect a desired narrow range of wavelengths back into the laser chamber. The prisms of the beam expander are made of a thermally stable material which transmits the coherent beam of light and wherein the prisms experience little change in optical properties with change in temperature. The aperture is positioned such that the tall and narrow coherent beam of light 100 generated in the laser chamber passes through the aperture.

The spectral narrowing assembly described above has at least one aperture that shapes the laser beam. An aperture may be placed between the laser chamber and the first prism through which the laser light from the chamber is transmitted, as illustrated. Alternatively or additionally, an aperture may be placed between prisms or between the last prism and the grating. The position of the aperture and the width of the opening in the aperture are selected to provide a beam of the desired dimensions.

There are at least two prisms in the beam expander, and the beam expander preferably has at least three prisms to expand the beam and spread it into its spectrum. It is desirable to expand the beam so that its expansion ratio (i.e. the ratio of the width of the beam exiting the beam expander to the width of the beam entering the beam expander from the laser chamber) as the beam exits the last prism is appropriately high so that the grating can effectively select the desired wavelength of light and discard light of undesired wavelengths. An additional benefit of a high expansion ratio is that the energy of the laser beam is spread over as much of the surface of the grating as feasible, which prolongs grating life. In various embodiments of the present invention, expansion ratios of between 5 and 30 would be preferred.

The prisms are made of a thermally stable material, as discussed previously. It is not necessary for all prisms in the beam expander to be made from a thermally stable material, although this configuration is preferred. The prism in which the laser beam is expanded to its greatest width is preferably made of thermally stable material such as calcium fluoride or magnesium fluoride, followed in preference by the prism in which the laser beam is expanded to its second greatest width. Some of the combinations of on are specified in Table 2 below.

TABLE 2

| Number of prisms in beam expander | Prism first contacted by light from the discharge chamber | Second prism through which light from the discharge chamber passes | Third prism through which light from the discharge chamber passes | Fourth prism through which light from the discharge chamber passes |
| --- | --- | --- | --- | --- |
| 2 | FS | TSM | — | — |
| 2 | TSM | FS | — | — |
| 2 | TSM | TSM | — | — |
| 3 | TSM | FS | FS | — |
| 3 | FS | TSM | FS | — |
| 3 | FS | FS | TSM | — |
| 3 | TSM | TSM | FS | — |
| 3 | TSM | FS | TSM | — |
| 3 | FS | TSM | TSM | — |
| 3 | TSM | TSM | TSM | — |
| 4 | TSM | FS | FS | FS |
| 4 | FS | TSM | FS | FS |

TABLE 2-continued

| Number of prisms in beam expander | Prism first contacted by light from the discharge chamber | Second prism through which light from the discharge chamber passes | Third prism through which light from the discharge chamber passes | Fourth prism through which light from the discharge chamber passes |
|---|---|---|---|---|
| 4 | FS  | FS  | TSM | FS  |
| 4 | FS  | FS  | FS  | TSM |
| 4 | TSM | TSM | FS  | FS  |
| 4 | TSM | FS  | TSM | FS  |
| 4 | TSM | FS  | FS  | TSM |
| 4 | FS  | TSM | TSM | FS  |
| 4 | FS  | TSM | FS  | TSM |
| 4 | FS  | FS  | TSM | TSM |
| 4 | TSM | TSM | TSM | FS  |
| 4 | TSM | FS  | TSM | TSM |
| 4 | TSM | TSM | FS  | TSM |
| 4 | FS  | TSM | TSM | TSM |
| 4 | TSM | TSM | TSM | TSM |

FS = fused silica; TSM = thermally stable material

The grating of the spectral narrowing assembly is preferably an echelle grating. The echelle grating is also preferably mounted to a curvature adjustment device as specified in U.S. Pat. No. 5,095,492, which patent is incorporated by reference to provide sufficient and enabling description, including description of a best mode of practicing this embodiment of the invention. Several other grating configurations well known for spectral narrowing could be substituted for the eschelle grating shown in FIG. 1.

The spectral narrowing assembly optionally has a total-reflection mirror 140 positioned between the prisms and the echelle grating. The mirror reflects the beam exiting the prisms onto the grating and vice versa. The mirror may be mounted to a curvature adjustment device as specified in U.S. Pat. No. 5,095,492 in addition to or instead of mounting the grating to a curvature adjustment device.

It is not necessary to position all of the components of the spectral narrowing assembly within one module or enclosure. For example, the aperture can be formed in the assembly which positions the back window onto the laser discharge chamber or can be formed in a plate between the window and the assembly, and the prisms and grating can be located on separate platforms that are attached to beams or rails within the enclosure that houses all of the laser components.

A laser equipped with a spectral narrowing assembly of this invention can have a longer lifetime. The spectral narrowing assembly suffers less heat damage to its optical components. Heat tends to distort optical components and also causes impurities or imperfections within those components to damage the components further. The rate of damage increases as more heat and imperfections build within the components and as components are heated or cooled rapidly. Consequently, the laser equipped with a spectral narrowing assembly of this invention can operate for a longer period of time before needing repairs or replacement.

In a preferred embodiment of the invention, a laser with a spectral narrowing assembly of this invention provided a narrower spectral bandwidth than a laser equipped with a spectral narrowing assembly having optical-grade fused silica prisms. The examples below show how the bandwidth of a laser beam was reduced from about 1.1 pm where optical-grade fused silica prisms were used within the spectral narrowing assembly to a low of about 0.75–0.8 pm when the last and/or next to last prisms of the spectral narrowing assembly were made of a thermally stable material such as $CaF_2$. Thus, a laser having a spectral narrowing assembly of this invention has the additional benefit of reduced bandwidth in certain preferred embodiments.

A laser of this invention has substantially less variation in beam width and thus in expansion ratio. The width of the laser beam after expansion through the beam expander can vary by up to 50% when the prisms of the beam expander are made of materials other than thermally stable materials. When at least one of the prisms is made of a thermally stable material, the width of the expanded beam varies significantly less, and in many instances the variance in beam width is about 10% or less.

The laser may optionally have a polarizing element that polarizes the laser beam for certain applications. The polarizing element may be located before any of the components of the spectral narrowing assembly, or the polarizing element may be a part of the components of the spectral narrowing assembly. The polarizing element may be a separate optical component such as a polarizer, or the polarizing element may be a polarizing coating on e.g. the prisms of the spectral narrowing assembly. Prisms may optionally be coated with an antireflection coating to prevent the substantial loss of light that occurs when prisms are mounted at large angles to the incident laser beam.

The spectral narrowing assembly of this invention can be used in many types of lasers where it is desired to reduce variations in the spectral bandwidth or where it is desirable to reduce the spectral bandwidth itself. For example, the spectral narrowing assembly of this invention can be used with other gas lasers such as $CO_2$ lasers or solid-state lasers such as NdYAG lasers. The spectral narrowing assembly of this invention is particularly suited to lasers that produce ultraviolet or near-UV light, such as KrF or ArF excimer lasers.

The advantages discussed herein are demonstrated in the following examples, which are included to illustrate the invention. The scope of the claims is not limited to the preferred embodiments or the following examples but is, instead, to be interpreted considering the discussion herein, the figures, the meaning of terms to one of ordinary skill in the art as used or defined herein, and the claims themselves.

EXAMPLES 1–6 AND COMPARATIVE
EXAMPLES A–B

In all examples, a KrF excimer laser was used to produce a tall, narrow laser beam having a nominal wavelength of 248.3 nm. The laser was configured substantially as illustrated in FIG. 1. The laser was operated at 100% duty cycle, with a pulse frequency of 600 Hz and a beam power of 12 mJ. After 60 seconds, the laser was operated at 10% duty cycle, and after 1000 seconds, the laser was switched to 100% duty cycle. Duty cycle is the percentage of time that the laser fires during a given time period. A 100% duty cycle indicates that the laser fired all of the time during the time period, and a 10% duty cycle indicates that the laser fired 10% of the time period (e.g., firing occurs in a burst for 0.1 sec., the laser is idled for 0.9 sec., and firing repeats).

The material from which each prism was made was varied according to Table 3 below.

Comments on Comparative Example A

Figures 2A, 2B:
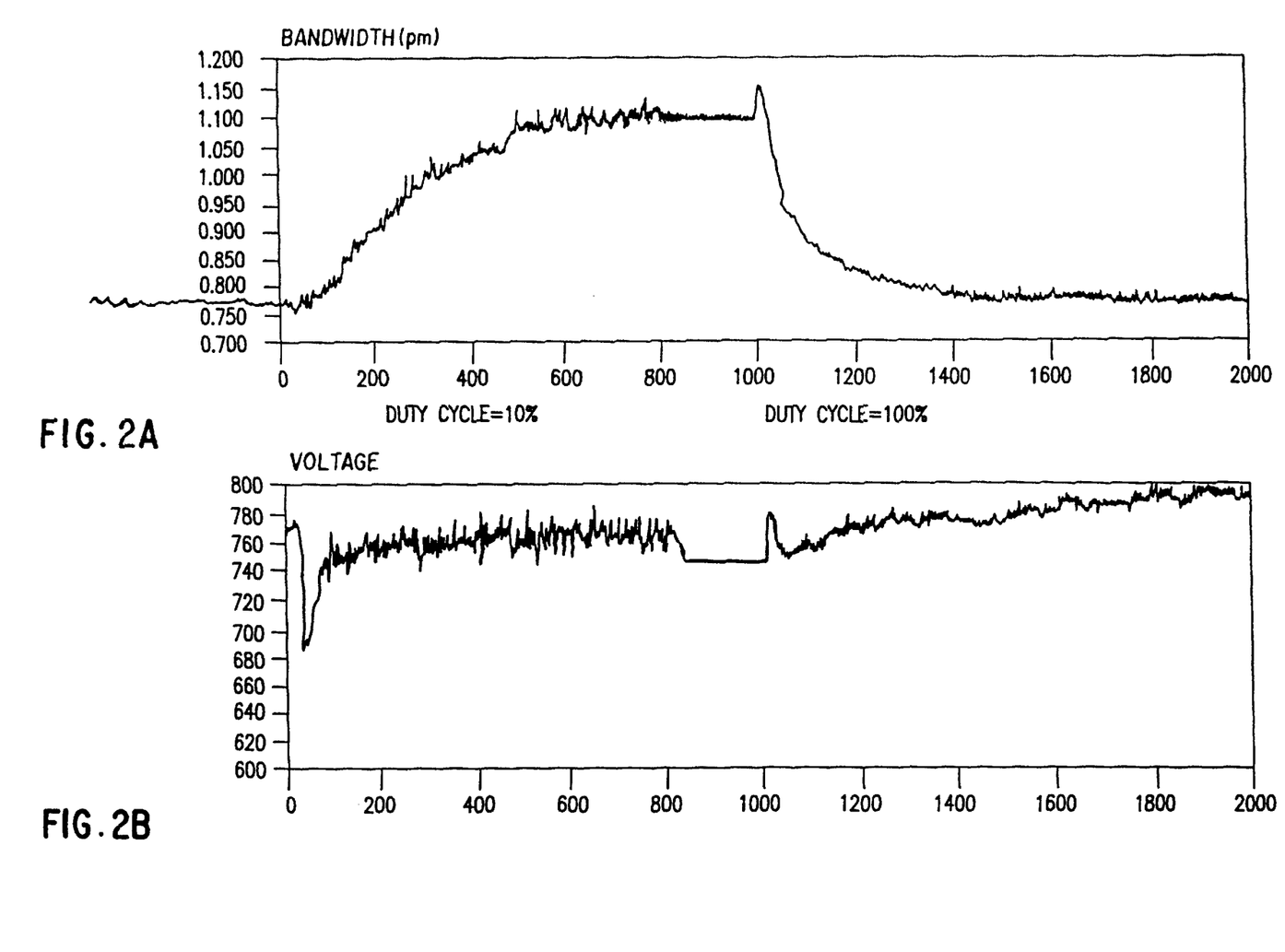
FIG. 2A shows the spectral bandwidth and its variation for an excimer laser that is not equipped with a spectral narrowing assembly of this invention.
FIG. 2B shows the voltage required to produce the laser beam whose spectral bandwidth is illustrated in FIG. 2A.

The laser utilizing optical-grade fused silica prisms exclusively had a large variation in spectral bandwidth with change in duty cycle, as illustrated in FIG. 2A. The difference between the spectral bandwidth when the laser was operated at 10% duty cycle (about 1.1 pm) and the spectral bandwidth when the laser was operated at 100% duty cycle (about 0.75 pm) was approximately 0.35 pm. Such optical-grade fused silica typically has a coefficient of thermal expansion of about $0.5 \times 10^{-6}$ (°C.)$^{-1}$, a rate of change in refractive index with temperature of about $12.8 \times 10^{-6}$ (°C.)$^{-1}$, a thermal conductivity of about 1.38 Wm$^{-1}$°C.$^{-1}$, and a coefficient of absorption of about 0.5–1%/cm for light having a wavelength of 248.3 nm. FIG. 2B shows that the voltage required to produce a laser beam fluctuated between about 740 and 785 volts at a 10% duty cycle and between about 750 and 795 volts for a duty cycle of 100%.

Comments on Example 1

Figure 3A:
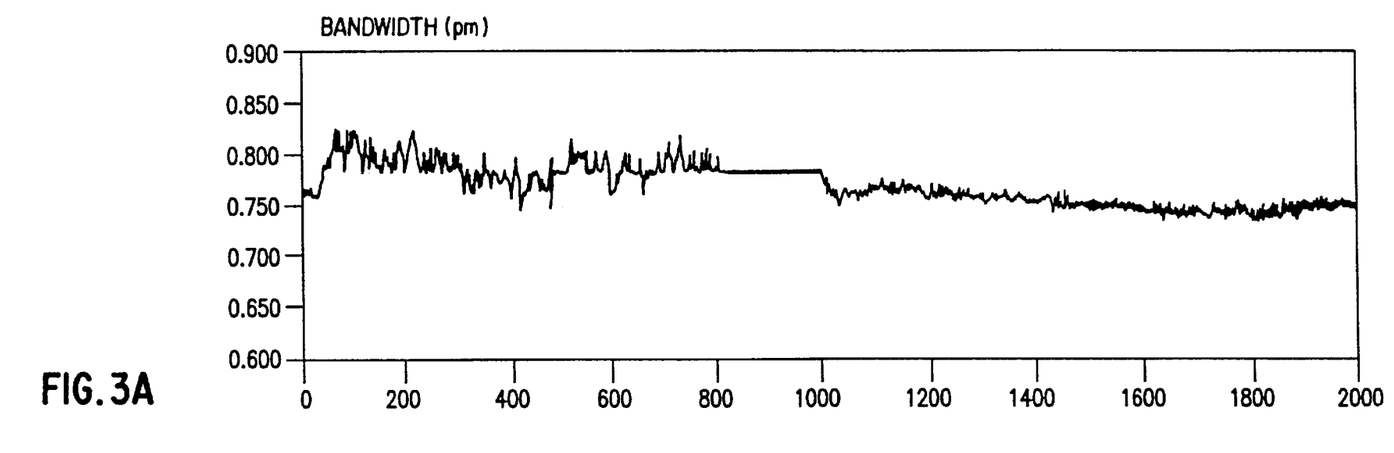
FIG. 3A shows the spectral bandwidth and its variation for an excimer laser that is equipped with a spectral narrowing assembly of this invention.
Figure 3B:
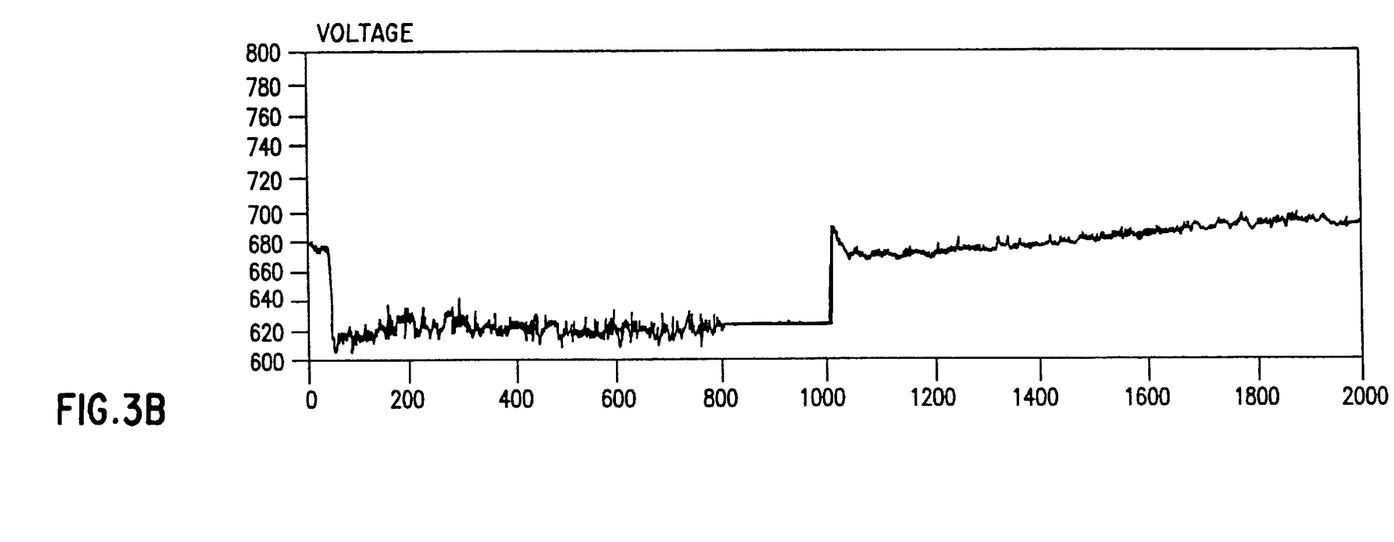
FIG. 3B shows the voltage required to produce the laser beam whose spectral bandwidth is illustrated in FIG. 3A.

This laser, utilizing one fused silica prism and two CaF$_2$ prisms, had little variation in spectral bandwidth with change in duty cycle, as illustrated in FIG. 3A. The difference between the spectral bandwidth when the laser was operated at 10% duty cycle (about 0.78 pm) and the spectral bandwidth when the laser was operated at 100% duty cycle (about 0.76 pm) was only about 0.02 pm. Further, the spectral bandwidth for the laser of this invention at 10% duty cycle was much lower than the spectral bandwidth for Comparative Example A at 10% duty cycle (0.78 pm v. 1.1 pm). Also, the laser of this invention has less variation in voltage when producing the laser beam. The voltage only fluctuated between about 610 and 640 volts for a laser of this invention for a 10% duty cycle and between about 670 and 690 volts for a 100% duty cycle. Thus, this example illustrates many benefits of this invention: spectral bandwidth stability is improved, spectral bandwidth is reduced, and power requirements are more stable.

Comments on Examples 2 and 3

Examples 2 and 3 also show that a substantial reduction in spectral bandwidth variance occurs when fewer than all of the prisms of the spectral narrowing assembly are made from a thermally stable material. It is especially surprising that the spectral bandwidth variance is reduced substantially when only the second and/or third prisms (i.e. the prism with the second shortest light path to the grating and the prism with the shortest light path to the grating, respectively, of a three-prism assembly) are made of a thermally stable material.

TABLE 3

| Example # | Prism first contacted by light from the discharge chamber | Second prism through which light from the discharge chamber passes | Third prism through which light from the discharge chamber passes | Spectral bandwidth variance (pm) (difference between spectral bandwidth at 10% duty cycle and 100% duty cycle, as discussed in the examples) |
|---|---|---|---|---|
| Comparative Example A | FSUC | FSUC | FSUC | 0.35 |
| Comparative Example B | FS | FS | FS | 0.25 |
| 1 | FS | CAF2 | CAF2 | 0.02 |
| 2 | FS | CAF2 | FS | 0.10 |
| 3 | CAF2 | CAF2 | FS | 0.15 |

FS = optical-grade fused silica coated with an anti-reflective coating
FSUC = optical-grade fused silica, uncoated
CAF2 = CaF$_2$, uncoated

Examples 4–6

The examples above are repeated using the configurations detailed in Table 4 below.

TABLE 4

| Example # | Prism first contacted by light from the discharge chamber | Second prism through which light from the discharge chamber passes | Third prism through which light from the discharge chamber passes |
|---|---|---|---|
| Comparative Example A | FSUC | FSUC | FSUC |
| Comparative Example B | FS | FS | FS |
| 4 | FS | FS | MGF2 |
| 5 | FS | MGF2 | MGF2 |
| 6 | MGF2 | MGF2 | MGF2 |

FS = optical-grade fused silica coated with a common anti-reflective coating
FSUC = optical-grade fused silica, uncoated
MGF2 = magnesium fluoride

What is claimed is:

1. An assembly for use in reducing the spectral bandwidth of a beam of light from an excimer laser chamber, said beam having light of a desired range of wavelengths and light of undesired wavelengths, said assembly comprising:

a. at least one aperture;

b. a beam expander comprising at least two prisms, wherein to avoid significant thermal distortion the prisms are made of a material which transmits the beam of light and wherein at least one of the prisms has an coefficient of absorption of no more than about 0.1 percent/cm for light at said desired range of wavelength; and c. a diffraction grating; wherein:
  i. said at least one aperture is in a position such that the beam of light from the laser chamber passes through the aperture;
  ii. the prisms of the beam expander are in a position such that the beam of light from the laser expands as the beam is transmitted through the prisms;
  iii. the grating is in a position such that at least a substantial portion of the beam of light exiting the prisms is reflected by the grating, the desired range of wavelengths being reflected back through the prisms of the beam expander and through the aperture and back into the laser chamber, and substantially all of said light of the undesired wavelengths not being reflected back into the laser chamber; and
  iv. variations in quantities of light reflected back into the chamber due to prism thermal distortion resulting from non-continuous laser operation is minimized or avoided.

2. An assembly for use in reducing the spectral bandwidth of a beam of light from an excimer laser chamber, said beam having light of a desired range of wavelengths and light of undesired wavelengths, said assembly comprising:

a. at least one aperture;

b. a beam expander comprising at least two prisms, wherein the prisms are made of a material which transmits the coherent beam of light and wherein to avoid significant thermal distortion at least one of the prisms has a rate of change of refractive index with temperature of no more than about $2.3 \times 10^{-6}$ for light having said desired range of wavelengths; and c. a diffraction grating; wherein:
  i. said at least one aperture is in a position such that the beam of light from the laser chamber passes through the aperture;
  ii. the prisms of the beam expander are in a position such that the beam of light from the laser expands as the beam is transmitted through the prisms;
  iii. the grating is in a position such that at least a substantial portion of the beam of light exiting the prisms is reflected by the grating, the desired range of wavelengths being reflected back through the prisms of the beam expander and through the aperture and back into the laser chamber, and substantially all of said light of the undesired wavelengths not being reflected back into the laser chamber; and
  iv. variations in quantities of light reflected back into the chamber due to prism thermal distortion resulting from non-continuous laser operation is minimized or avoided.

3. An assembly for use in reducing the spectral bandwidth of a beam of light from an excimer laser chamber, said beam having light of a desired range of wavelengths and light of undesired wavelengths, said assembly comprising:

a. at least one aperture;

b. a beam expander comprising at least two prisms, wherein the prisms are made of a material which transmits the coherent beam of light and wherein to avoid significant thermal distortion at least one of the prisms has a thermal conductivity of at least about 9.71 $Wm^{-1}°C.^{-1}$ at a temperature of 20 deg C.; and c. a diffraction grating; wherein:
  i. said at least one aperture is in a position such that the beam of light from the laser chamber passes through the one aperture;
  ii. the prisms of the beam expander are in a position such that the beam of light from the laser expands as the coherent beam is transmitted through the prisms;
  iii. the grating is in a position such that at least a substantial portion of the beam of light exiting the prisms is reflected by the grating, the desired range of wavelengths being reflected back through the prisms of the beam expander and through the aperture and back into the laser chamber, and substantially all of said light of the undesired wavelengths not being reflected back into the laser chamber; and
  iv. variations in quantities of light reflected back into the chamber due to prism thermal distortion resulting from non-continuous laser operation is minimized or avoided.

4. An assembly for use in reducing the spectral bandwidth of a beam of light from an excimer laser chamber, said coherent beam having light of a desired range of wavelengths and light of undesired wavelengths, said assembly comprising:

a. at least one aperture;

b. a beam expander comprising at least two prisms, wherein the prisms are made of a material which transmits the beam of light, wherein at least one of the prisms is secured to a prism mount, and wherein to avoid significant thermal distortion said at least one of the prisms has a coefficient of thermal expansion about equal to the coefficient of thermal expansion of the prism mount; and c. a diffraction grating; wherein:
  i. said at least one aperture is in a position such that the coherent beam of light from the laser chamber passes through the aperture;
  ii. the prisms of the beam expander are in a position such that the coherent beam of light from the laser expands as the coherent beam is transmitted through the prisms;
  iii. the grating is in a position such that at least a substantial portion of the beam of light exiting the prisms is reflected by the grating, the desired range of wavelengths being reflected back through the prisms of the beam expander and through the aperture and back into the laser chamber, and substantially all of said light of the undesired wavelengths not being reflected back into the laser chamber; and
  iv. variations in quantities of light reflected back into the chamber due to prism thermal distortion resulting from non-continuous laser operation is minimized or avoided.

5. The assembly of claim 4 wherein the coefficient of thermal expansion of said at least one prism is between about $9 \times 10^{-6}$ and about $24 \times 10^{-6} °C.^{-1}$.

6. An assembly for use in reducing the spectral bandwidth of a coherent beam of light from an excimer laser chamber, said coherent beam having light of a range of desired wavelengths and light of undesired wavelengths, said assembly comprising:

a. at least one aperture;

b. a beam expander comprising at least two prisms, wherein the coefficient of thermal expansion, the thermal conductivity, and the coefficient of transmittance of the prisms are selected to provide a laser beam bandwidth variance that is no more than 50% of the laser beam bandwidth variance supplied by a assembly wherein the assembly is identical to the claimed assembly in all respects except that the prisms of the beam expander are made of fused silica, wherein the laser beam bandwidth variance is the difference between a laser beam bandwidth measured when the laser is fired at a duty cycle of 10% and a laser beam bandwidth measured when the laser is fired at a duty cycle of 100%, wherein the laser is fired at said duty cycle of 100% immediately after said laser is fired at said duty cycle of 10%, and wherein the coherent beam of light has an energy of 12 mJ and a wavelength of 248.3 nm; and c. a diffraction grating; wherein:
   i. said at least one aperture is in a position such that the coherent beam of light from the laser chamber passes through the opening of said at least one aperture;
   ii. the prisms of the beam expander are in a position such that the coherent beam of light from the laser expands as the coherent beam is transmitted through the prisms;
   iii. the grating is in a position such that the coherent beam of light exiting the prisms is reflected by the grating, and the grating is in a position to reflect light of the desired wavelength back through the prisms of the beam expander and through the aperture and into the laser chamber;
   iv. the grating is in a position such that the grating reflects the light of the undesired wavelength such that substantially all of said light of the undesired wavelength impinges on an area other than the aperture; and
   iv. variations in quantities of light reflected back into the chamber due to prism thermal distortion resulting from non-continuous laser operation is minimized or avoided.

7. The assembly of any of claims 1–4 and 6 wherein an aperture is in a position between two of said prisms.

8. The assembly of any of claims 1–4 and 6 wherein said grating is an echelle grating.

9. The assembly of claim 7 wherein the grating is mounted to an adjustable curvature device.

10. The assembly of claim 7 and further comprising a mirror positioned to reflect the beam of light exiting the beam expander onto said grating.

11. The assembly of any of claims 1–4 wherein the desired range of wavelengths is a range including or close to 248 nm.

12. The assembly of any of claims 1–4 wherein the desired range of wavelengths is a range including or close to 193 nm.

13. An excimer laser comprising an excimer laser discharge chamber and the assembly of any of claims 1–4 and 9.

14. The invention of any of claims 1–4, 6, and 10 wherein the beam expander comprises at least three prisms.

15. The invention of any of claims 1–4, 6, and 10 wherein said at least one of the prisms comprises calcium fluoride.

16. An excimer laser having an assembly for reducing the spectral bandwidth of a beam of light generated by the laser, said laser comprising:
   a. an excimer laser discharge chamber for generating a laser beam; and
   b. an assembly for reducing the spectral bandwidth of the beam, wherein said assembly comprises a beam expander having at least two prisms,
      i. wherein the prisms are made of a material which transmits the beam of light and wherein at least one of the prisms is made from a material selected from the group consisting of materials having a coefficient of thermal expansion of at least about $8.48 \times 10^{-6}$ (deg C.)$^{-1}$, materials having a thermal conductivity of at least about 9.7 $\text{Wm}^{-1}\text{°C.}^{-1}$ at 20 deg C., materials having a coefficient of absorption of no more than about 0.1 percent/cm for light having a wavelength of 248.3 nanometers, and materials that provide a laser beam bandwidth variance that is no more than 50% of the laser beam bandwidth variance supplied by a assembly wherein the assembly is identical to the claimed assembly in all respects except that the prisms of the beam expander are made of fused silica, wherein the laser beam bandwidth variance is the difference between a laser beam bandwidth measured when the laser is fired at a duty cycle of 10% and a laser beam bandwidth measured when the laser is fired at a duty cycle of 100%, wherein the laser is fired at said duty cycle of 100% immediately after said laser is fired at said duty cycle of 10%, and wherein the coherent beam of light has an energy of 12 mJ and a wavelength of 248.3 nm, and
      ii. wherein the assembly has a position on said laser such that at least a majority of the beam generated by the source of laser light passes through the prisms of the beam expander.

* * * * *